(12) United States Patent
Beraud-Sudreau et al.

(10) Patent No.: US 10,873,441 B2
(45) Date of Patent: Dec. 22, 2020

(54) METHOD FOR SYNCHRONIZING DIGITAL DATA SENT IN SERIES

(71) Applicant: TELEDYNE E2V SEMICONDUCTORS SAS, Saint Egreve (FR)

(72) Inventors: Quentin Beraud-Sudreau, Rives (FR); Jérôme Ligozat, Grenoble (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 0 days.

(21) Appl. No.: 16/832,117

(22) Filed: Mar. 27, 2020

(65) Prior Publication Data
US 2020/0313842 A1 Oct. 1, 2020

(30) Foreign Application Priority Data

Mar. 29, 2019 (FR) ..................................... 19 03376

(51) Int. Cl.
*H04L 7/00* (2006.01)
(52) U.S. Cl.
CPC ................................. *H04L 7/0029* (2013.01)
(58) Field of Classification Search
CPC ..................................................... H04L 7/0029
See application file for complete search history.

(56) References Cited

U.S. PATENT DOCUMENTS

| | | | | | |
|---|---|---|---|---|---|
| 3,128,342 A | * | 4/1964 | Baker | ................ | H04L 27/2092 375/308 |
| 4,236,144 A | * | 11/1980 | Sunagawa | ............... | G01F 23/44 340/623 |
| 4,355,387 A | * | 10/1982 | Portejoie | ................ | H04J 3/073 370/506 |
| 5,715,244 A | * | 2/1998 | Park | ..................... | H04B 7/2628 370/335 |
| 5,781,553 A | * | 7/1998 | Choi | ..................... | H04W 84/16 370/464 |
| 5,790,072 A | * | 8/1998 | Gerveshi | ................. | H04J 3/047 341/141 |
| 5,930,360 A | * | 7/1999 | Okino | .................... | H04H 60/15 380/213 |
| 6,028,668 A | * | 2/2000 | Rider | ..................... | G01C 19/72 356/460 |
| 6,108,349 A | * | 8/2000 | Melsa | ..................... | H04L 5/023 370/465 |
| 6,946,873 B1 | * | 9/2005 | Sendrovitz | ................ | G06F 1/10 326/37 |

(Continued)

FOREIGN PATENT DOCUMENTS

| | | | | | |
|---|---|---|---|---|---|
| BE | 619449 A | * | 10/1962 | ......... | H04L 27/2071 |
| CN | 1363892 A | * | 8/2002 | .......... | H04M 11/066 |

(Continued)

*Primary Examiner* — Berhanu Tadese
(74) *Attorney, Agent, or Firm* — Pilloff Passino & Cosenza LLP; Sean A. Passino; Rachel K. Pilloff

(57) ABSTRACT

The present invention relates to a method for synchronizing digital data sent in series by a transmitter to a receiver, and to a device allowing such a method to be implemented. The invention aims to provide a method for synchronizing serial digital data without using a FIFO memory. The invented is based on the use of a single clock, in particular that of the receiver.

10 Claims, 5 Drawing Sheets

| | |
|---|---|
| A - | Transmitter |
| B - | Receiver |
| BS - | Flip-flop |
| CMF - | Formatting Circuit |
| CT_B - | Processing Circuit |
| d - | output |
| D - | Digital datum |
| E - | Equalizer |
| freq1 - | frequency 1 |
| freq2 - | frequency 2 |
| IN - | Input |
| h1 - | clock signal of freq1 |
| h2 - | clock signal of freq2 |
| ME - | State Machine |
| MUX - | Multiplexer |
| T - | buffer |
| V - | Channel |

(56) References Cited

U.S. PATENT DOCUMENTS

| | | | |
|---|---|---|---|
| 7,366,270 B2* | 4/2008 | Tang | G06F 5/12 327/161 |
| 8,705,605 B1* | 4/2014 | Raman | H04L 25/03878 375/232 |
| 9,356,610 B1* | 5/2016 | Harayama | H03L 7/0807 |
| 10,320,406 B2* | 6/2019 | Bouin | H03M 1/123 |
| 2002/0080809 A1* | 6/2002 | Nicholson | H04N 21/23602 370/412 |
| 2002/0109879 A1* | 8/2002 | Wing So | H04J 14/0241 398/58 |
| 2003/0016770 A1* | 1/2003 | Trans | H04L 1/0054 375/346 |
| 2003/0091035 A1* | 5/2003 | Roy | H04J 3/0685 370/353 |
| 2004/0071109 A1* | 4/2004 | Herle | H04L 63/0272 370/328 |
| 2004/0125902 A1* | 7/2004 | Nishimura | H03K 5/135 375/371 |
| 2004/0128578 A1* | 7/2004 | Jonnalagadda | H04J 3/0691 713/400 |
| 2006/0285424 A1* | 12/2006 | Gregorius | G11C 7/1078 365/233.1 |
| 2007/0006053 A1* | 1/2007 | Otto | H04L 25/14 714/700 |
| 2007/0075877 A1* | 4/2007 | Goller | H04L 7/005 341/50 |
| 2007/0101087 A1* | 5/2007 | Gregorius | G06F 13/4256 711/167 |
| 2008/0013609 A1* | 1/2008 | Daxer | H04L 1/243 375/221 |
| 2008/0034421 A1* | 2/2008 | Ahn | H04L 63/10 726/17 |
| 2008/0273504 A1* | 11/2008 | Foley | H04N 21/2381 370/337 |
| 2009/0296698 A1* | 12/2009 | Sutou | H04L 49/3027 370/382 |
| 2010/0079316 A1* | 4/2010 | Okuno | H03M 9/00 341/100 |
| 2010/0232325 A1* | 9/2010 | Weber | H04N 21/6118 370/297 |
| 2011/0026355 A1* | 2/2011 | Irisawa | G11C 8/18 365/233.1 |
| 2012/0084062 A1* | 4/2012 | Maturana | G06F 30/33 703/6 |
| 2012/0105219 A1* | 5/2012 | Kofler | H04B 5/0062 340/426.16 |
| 2017/0111135 A1* | 4/2017 | Hays | H04J 13/0044 |
| 2017/0281115 A1* | 10/2017 | Julien | A61B 6/461 |
| 2018/0008214 A1* | 1/2018 | Papaix | H04N 3/155 |
| 2018/0097139 A1* | 4/2018 | Li | H01L 31/107 |

FOREIGN PATENT DOCUMENTS

| | | | | |
|---|---|---|---|---|
| CS | 230391 | B1 * | 8/1984 | |
| EP | 0488212 | A2 * | 6/1992 | H04J 3/0629 |
| GB | 1418717 | A * | 12/1975 | H04L 7/046 |
| JP | 57004630 | A * | 1/1982 | H04L 25/45 |
| JP | 57162040 | A * | 10/1982 | H03M 13/09 |
| JP | 59033546 | A * | 2/1984 | G06F 7/026 |
| JP | 59178037 | A * | 10/1984 | H04J 3/0626 |
| JP | 61288643 | A * | 12/1986 | |
| JP | 01076563 | A * | 3/1989 | |
| JP | 01303935 | A * | 12/1989 | |
| JP | 02246462 | A * | 10/1990 | |
| JP | 03109836 | A * | 5/1991 | |
| JP | 05183526 | A * | 7/1993 | H04L 25/14 |
| JP | 11213570 | A * | 8/1999 | H03L 7/0814 |
| JP | 2001023371 | A * | 1/2001 | H03K 5/1534 |
| WO | WO-2017080925 | A1 * | 5/2017 | H03M 1/123 |

* cited by examiner

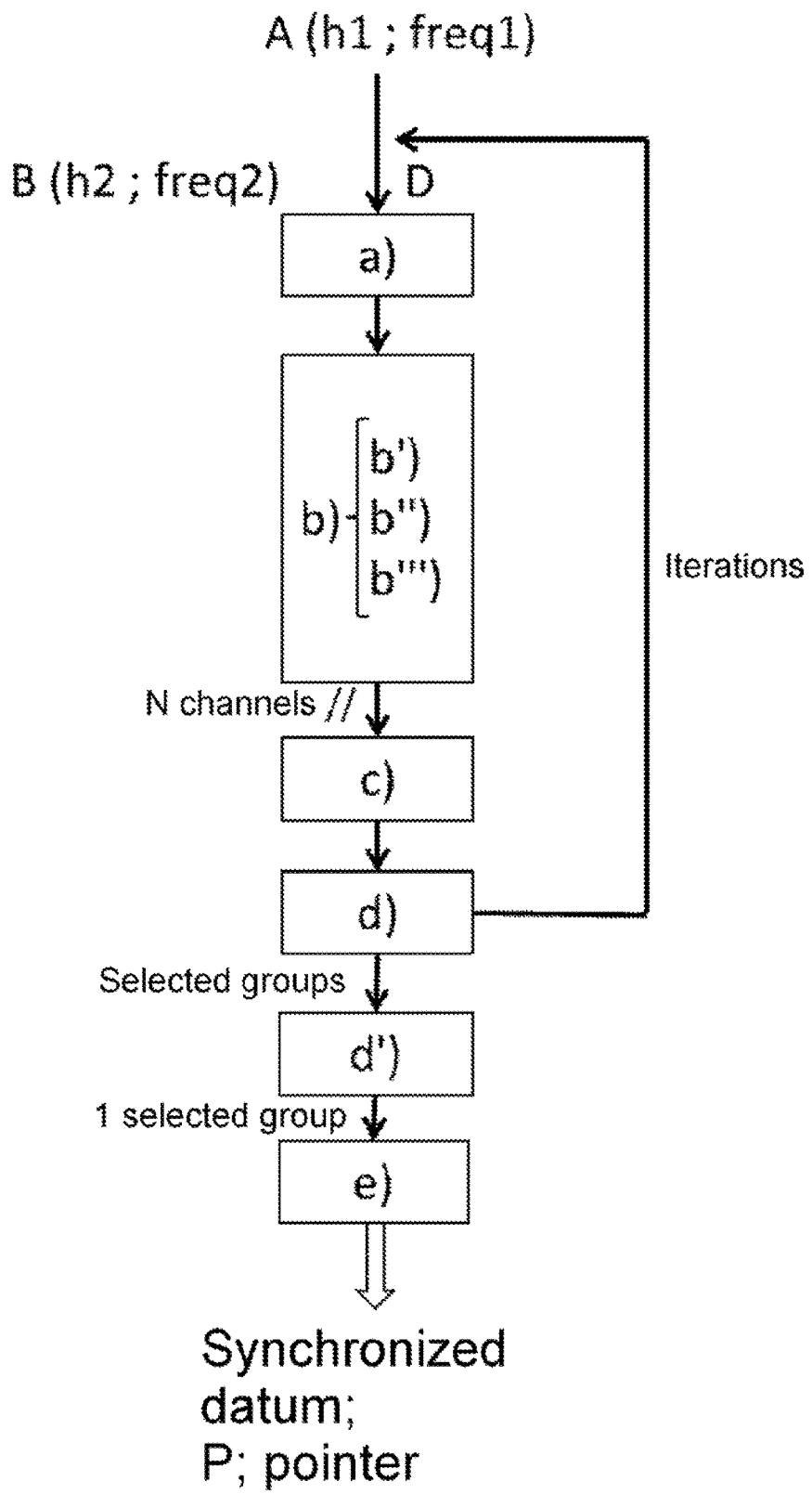
[Fig. 1]

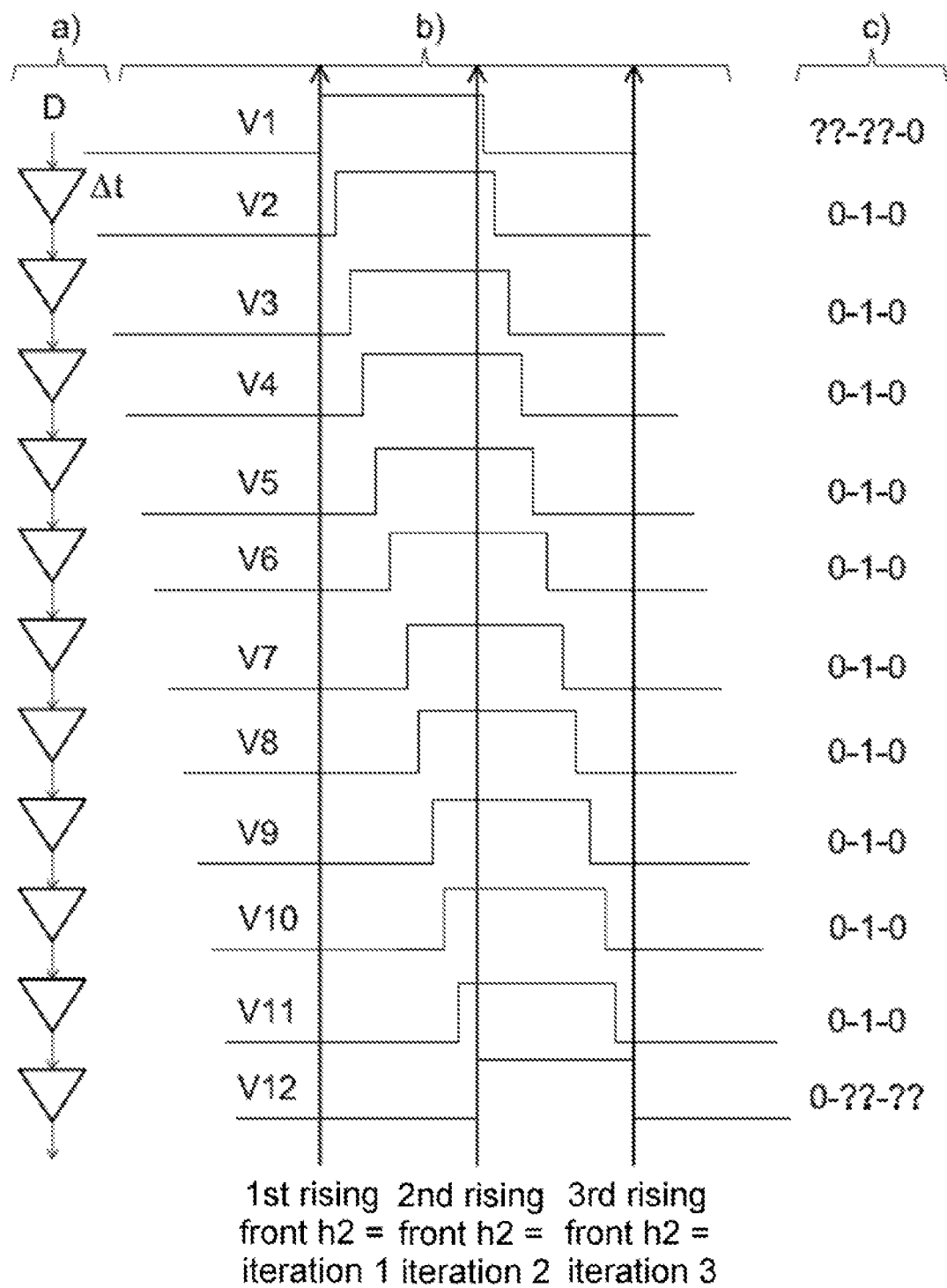
[Fig. 2]

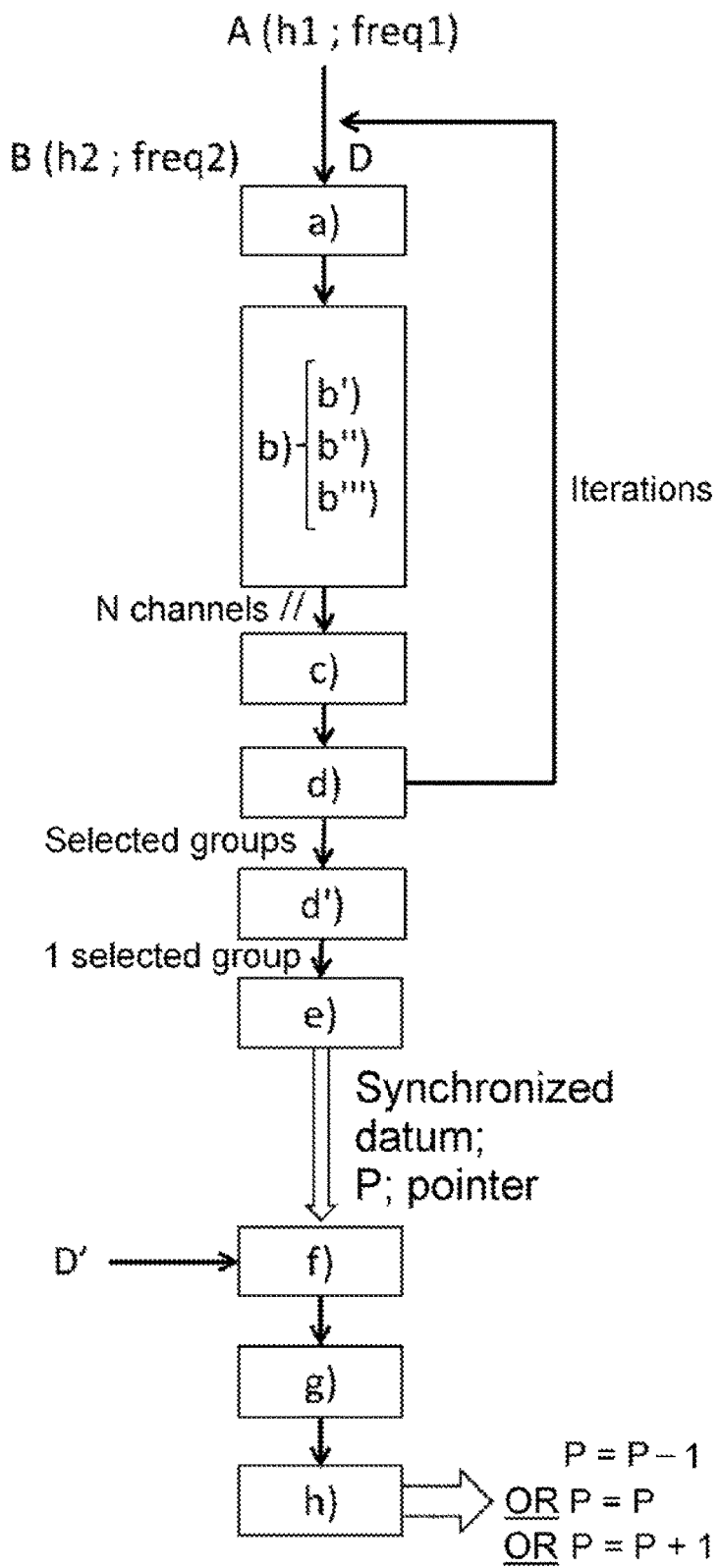
[Fig. 3]

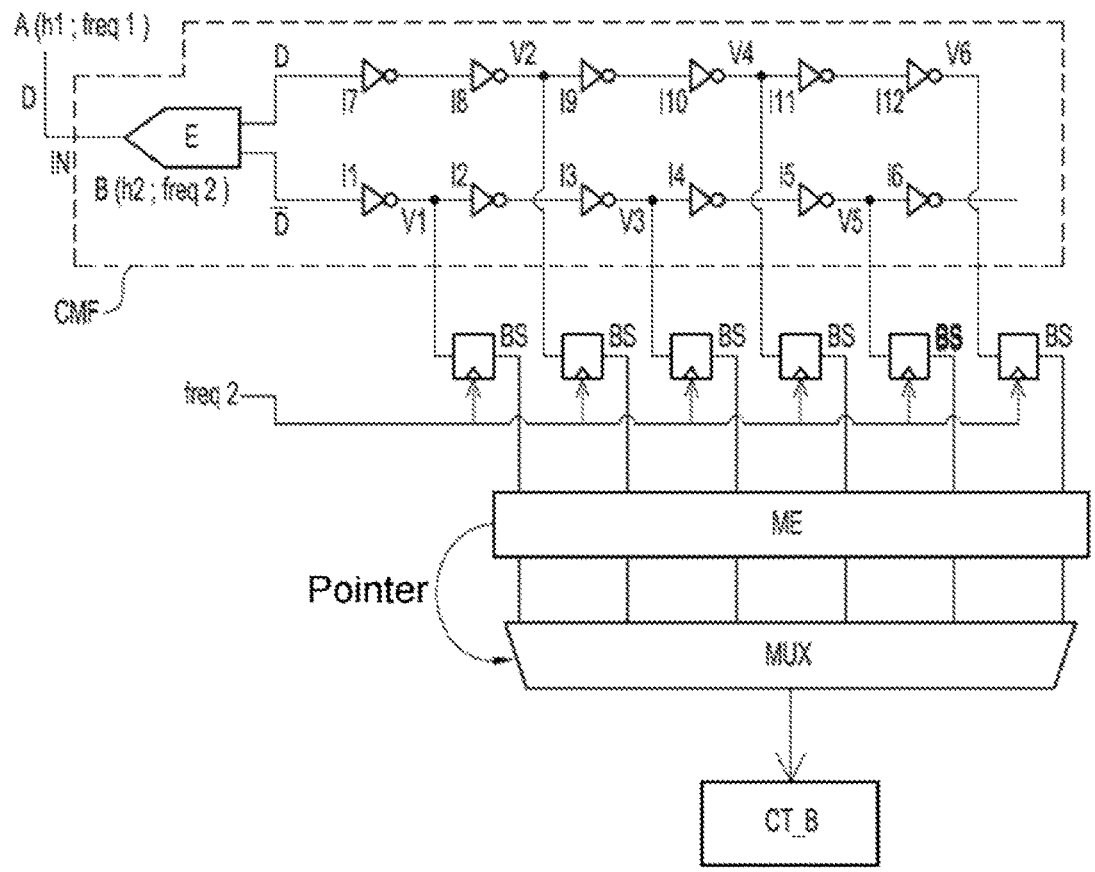
| A - | Transmitter | h1 - | clock signal of freq1 |
| B - | Receiver | h2 - | clock signal of freq2 |
| BS - | Flip-flop | I - | Inverter |
| CMF - | Formatting Circuit | IN - | Input |
| CT_B - | Processing Circuit | ME - | State Machine |
| D - | Digital datum | MUX - | Multiplexer |
| E - | Equalizer | V - | Channel |
| freq1 - | frequency 1 | | |
| freq2 - | frequency 2 | | |
[Fig. 4]

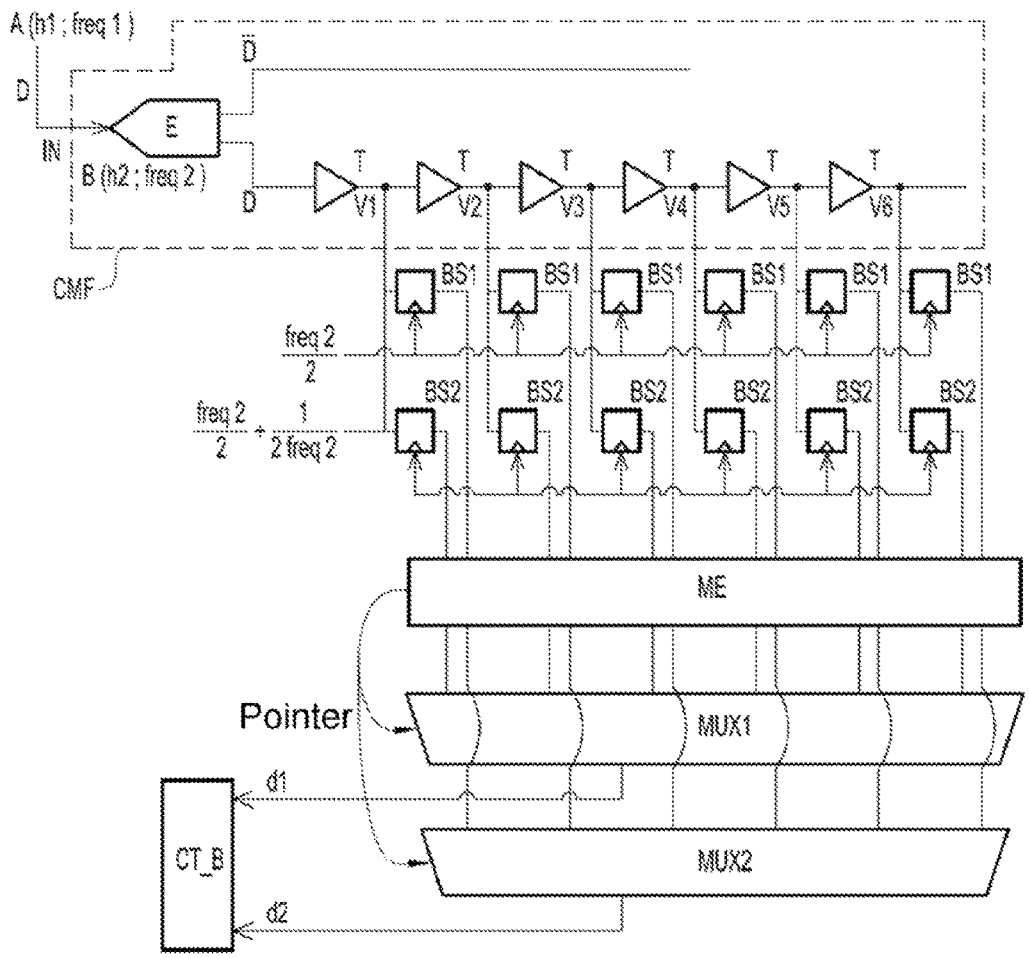
| | | | |
|---|---|---|---|
| A - | Transmitter | IN - | Input |
| B - | Receiver | h1 - | clock signal of freq1 |
| BS - | Flip-flop | h2 - | clock signal of freq2 |
| CMF - | Formatting Circuit | ME - | State Machine |
| CT_B - | Processing Circuit | MUX - | Multiplexer |
| d - | output | T - | buffer |
| D - | Digital datum | V - | Channel |
| E - | Equalizer | | |
| freq1 - | frequency 1 | | |
| freq2 - | frequency 2 | | |
[Fig. 5]

METHOD FOR SYNCHRONIZING DIGITAL DATA SENT IN SERIES

CROSS REFERENCE TO RELATED APPLICATION

This application claims priority to France Application No. 1903376, filed Mar. 29, 2019, the entire disclosure of which is incorporated herein by reference.

FIELD

The present invention relates to a method for synchronizing digital data sent in series by a transmitter to a receiver, and to a device allowing such a method to be implemented.

SUMMARY

Digital data are generally sent by a sender having a clock signal different from that of the receiver. In order to ensure that these data, sent in series, are correctly received by the receiver, it is necessary for them to be synchronized with the clock signal of the receiver.

There are various solutions for synchronizing data sent by the transmitter with the clock of the receiver, such as for example the use of a phase-locked loop or over-sampling of the data.

The use of a phase-locked loop is an analogue solution that may be tricky to implement in particular because of the need to study the stability of the loop to implement it, its long design process and its non-reusability in case of a change in specifications.

The method of data over-sampling is based on generation of many clock phase-shifts using the clock of the receiver, and on a voting system that makes it possible to choose the clock, called the elected clock, that is the clock that is centremost in the eye of the eye diagram (representation of the received data stream on the oscilloscope that is synchronized with the clock signal of the receiver) of the input data. Furthermore, for all the data that reaches the receiver, the elected clock must also be synchronized with the clock of the receiver, because the elected clock may only be metastable with respect to the clock of the receiver. This requires a unit for generating clock phases, a voting system and a system for re-sampling the input data. The unit for generating clock phases is often a dual-clock FIFO (first-in first-out) memory. The FIFO memory does not generate clock phase-shifts, it just allows data to be written with a first clock and these data to be read with a second clock. This makes it possible to form the interface between the clock of the receiver and the elected clock. The drawback of this memory is that it is bulky, has a high power consumption and takes up a lot of space, because it must be present on each input channel of the receiver.

The invention aims to remedy the aforementioned drawbacks of the prior art, and more particularly it aims to provide a method for synchronizing serial digital data without using a FIFO memory, the method being based on the use of a single clock, in particular that of the receiver.

One subject of the invention is therefore a method for synchronizing digital data sent in series by a transmitter having a clock signal of frequency freq1 to a receiver having a clock signal frequency freq2, characterized in that it comprises the steps a) to d) iterated until a stoppage condition is met and a step e) carried out following the last iteration of step d), the steps a) to e) being the following:

a) sending with the transmitter a digital datum to the receiver;
b) generating N channels, each of the channels containing the datum received by the receiver, and each ith channel being time shifted with respect to the (i−1)th channel, N being an integer higher than or equal to 3 and i being comprised between 2 and N;
c) sampling the N channels at the frequency freq2 of the clock h2 of the receiver in order to generate digital data temporally aligned with the clock h2;
d) comparing the data of the N channels in groups of (2m+1) successive channels, m being higher than or equal to 1 and such that (2m+1) is lower than or equal to N, and selecting groups of (2m+1) channels in which the (2m+1) successive channels contain identical data in each iteration;
e) selecting one of the channels belonging to the group selected in the preceding step, the data contained in this channel being considered to be synchronized and in phase with the clock h2 of the receiver and defining a variable P equal to the value i of the selected channel.

According to a plurality of embodiments of the invention:
During the first iteration of step d), the comparison of the values in groups of (2m+1) successive channels is carried out on the N channels and during the following iterations, it is carried out on all the (2m+1) successive channels comprised in the groups selected in the preceding iteration of step d);
The method comprises a step d') carried out between the last iteration of step d) and step e) in which a group of (2m+1) successive channels is chosen among the groups selected in the last iteration of step d), this chosen group possibly being the single group selected in the last iteration of step d), or among the groups selected in the last iteration of step d), this chosen group possibly being the group having the highest value of m, or among the groups selected in the last iteration of step d), this chosen group possibly being the group the successive channels of which are closest to the channel N/2 if N is even or to the channel (N+1)/2 if N is odd;
The channel selected in step e) is the channel m+1, of a group of (2m+1) successive channels, selected in the preceding step;
The stoppage condition is chosen among a number of iterations defined by a user or being that there remains only a single group of (2m+1) successive channels containing identical data in step d);
Step b) also comprises an interpolation of the data of the N channels;
m is comprised between 1 and 4;
Step c) comprises a plurality of substeps of sampling the N channels at frequencies strictly lower than the frequency freq2, so that following all the sampling substeps, the N channels will have been sampled at the frequency freq2;
The method comprises the following additional steps carried out following step e):
f) sending with the transmitter a digital datum to the receiver, generating N channels, each of the channels comprising the datum received by the receiver, and each ith channel being time shifted with respect to the (i−1)th channel, N being an integer higher than or equal to 3 and i being comprised between 2 and N, and sampling the N channels at the frequency freq2 in order to generate digital data temporally aligned with the clock h2;

g) comparing the digital data of the (2m+1) successive channels of the group selected in step d) and containing the Pth channel, P being defined in step e);

h) modifying the value of P if the values of the data of the (2m+1) channels compared in step g) are different, such that if the datum of the channel m of the group of (2m+1) channels is different from the channel (m+1), then the value of P becomes equal to (P−1), or such that is the datum of the channel m+2 of the group of (2m+1) channels is different from the channel (m+1), then the value of P becomes equal to (P+1).

Another subject of the invention is a device for synchronizing digital data for implementing a synchronizing method according to the invention, comprising:

a circuit for formatting a digital datum received on an input of the device, comprising N outputs and connected to the input of the device and configured so as to generate N channels each containing the digital datum and to time shift each channel with respect to the preceding channels, N being an integer higher than or equal to 3 and the N channels corresponding to the N outputs of the circuit;

flip-flops configured so that the N channels are sampled at a frequency lower than or equal to the clock frequency of the receiver, the N channels comprising at least one flip-flop; and a state machine configured to receive as input at least N sampled channels and to compare the data of (2m+1) channels contained in the same group, to select at least one group of (2m+1) successive channels, to select a channel belonging to a selected group and to define the value of P.

BRIEF DESCRIPTION OF THE DRAWINGS

Other features, details and advantages of the invention will become apparent on reading the description given with reference to the appended figures, which are given by way of example and show, respectively:

FIG. 1, a schematic of the steps of the method according to a first embodiment of the invention;

FIG. 2, a timing diagram of steps a), b) and c) of the method according to the invention;

FIG. 3, a schematic of the steps of the method according to a second embodiment of the invention;

FIG. 4, a device according to the invention allowing the method according to invention to be implemented; and FIG. 5, a device according to another embodiment of the invention allowing the method to be implemented.

DETAILED DESCRIPTION

[FIG. 1] shows a schematic of the steps of a method for synchronizing digital data, sent in series, with a clock signal of a receiver B according to a first embodiment of the invention. The method comprises four steps a) to d) iterated until a stoppage condition is met and a step e) carried out after the last iteration of step d). The method may also comprise a step d') carried out between the last iteration of step d) and step e).

The first step (step a)) consists in sending digital data D, containing a set of bits, to a receiver B with a transmitter A. The transmitter A is synchronized with a clock h1 of frequency freq1, whereas the receiver B is synchronized with a clock h2 of frequency freq2. In each iteration of step a), new data D are sent by the transmitter A to the receiver B, these data possibly being identical to or different from the data D sent in the preceding iteration. The frequency freq1 may be equal to the frequency freq2.

In step b), N channels each containing the datum D sent in step a) are generated, N being an integer higher than or equal to 3. Each channel is time shifted with respect to the preceding one. Thus, between the ith channel and the (i−1)th channel, i being an integer comprised between 2 and N, there is a time shift. This step b) allows a plurality of channels each containing the datum D sent by the transmitter A and each having a phase shift with respect to the clock h2 to the generated, the number of channels generated being sufficient to cover all of one period of the clock signal h2, this number of channels being at least 3.

Next, in step c), the N channels are sampled, at the same time, at the frequency freq2 of the clock signal h2 of the receiver B. This allows, for each of the channels, and for each iteration of the method, the bit value representing the "state of the datum" contained in the channel at the point in time at which the sampling is carried out to be obtained.

[FIG. 2] shows an example of a timing diagram of steps a), b) and c) of the method, in which 12 channels are generated, and for which one iteration corresponds to one clock tick of h2. In step a), a digital datum D is sent by a transmitter A to a receiver B. In step b), 12 channels (V1 to V12) are generated and a time shift Δt is present between two successive channels. The data shown in FIG. 2 for step b) are the data received at the end of three iterations. Next, in step c), the 12 generated channels are sampled, this allowing the "state of the datum" contained in each channel on each clock tick of h2 to be obtained, because in this example one iteration takes place on each clock tick of h2. Thus, in the first channel (V1), the clock tick occurred during the change of state of the datum (i.e. at the moment when the bit value was passing from 0 to 1), and therefore, in the 1st iteration, for channel 1 (V1), the returned value will be comprised strictly between 0 and 1, whereas for channel 2 (V2), it will be 0. Thus, for the three iterations shown in FIG. 2, it may be seen that in channel 1 (V1), a succession of bits XX-XX-0 will be obtained, where XX represents a number comprised strictly between 0 and 1, whereas for channels 2 to 11 (V2 to V11) the succession 0-1-0 will be obtained and for channel 12 (V12) 0-XX-XX will be obtained.

This sampling step may be a single step of sampling at the frequency freq2, or it may be a succession of substeps c'), c''), c''') of sampling at a frequency strictly lower than freq2, so that the sampling in its entirety (i.e. after all the substeps c'), c''), c'''')) results in N channels sampled at the frequency freq2. Each sampling substep is time shifted by a half-period of the clock signal h2 of the receiver B with respect to the preceding sampling substep (for example between the substeps c') and c'') or between c'') and c''')), because it is not possible, for a given channel, to carry out the sampling substeps at the same time. The sampling substeps make it possible to work with high-frequency clock signals. For example, for data that must be sampled at 12 GHz, four sampling substeps could be carried out at 3 GHz. The data present in the N sampled channels are therefore synchronized and in phase with the clock h2 at the end of this step. The following steps of the method will allow which channel data are usable by the receiver B to be determined, i.e. which data may be considered to be at the centre of the eye of the eye diagram to be determined.

Next, in step d), the digital data, i.e. the values of the bits, of the N channels are compared in groups of (2m+1) successive channels, m being an integer higher than or equal to 1 and such that (2m+1) is lower than or equal to N. The groups of (2m+1) successive channels in which the (2m+1) channels have identical data in each iteration of steps a) to d) are then selected. Considering the example of FIG. 2, for the first iteration the bit values of the 12 channels are therefore compared and it may be seen that channels 2 to 12 have identical values; it is therefore possible to select the group V2 to V12 containing 11 successive channels containing identical data, the groups V2 to V10, V3 to V11 and V4 to V12 containing 9 successive channels containing identical data, etc. For the second iteration, channels 2 to 11 have identical values, and it is therefore possible to select the group V2 to V10 containing 9 successive channels and the group V3 to V11 also containing 9 successive channels, etc.

Lastly, in step e), one of the channels belonging to the groups selected in the preceding step is selected. The data contained in this channel will be statistically those that would be present in the middle of the eye if the eye diagram were looked at, they are therefore considered to be synchronized and in phase with the clock h2 of the receiver B. In this step, a variable denoted P, equal to the number of the selected channel, i.e. equal to the value i of the selected channel, is also defined. It is the data of this Pth channel that are used by the receiver B.

The method may also comprise a step d') carried out just before step e), consisting in choosing one group among the groups selected in the last iteration of step d). Specifically, it is possible for, in the last iteration of step d), a plurality of groups to have been selected; however, only one channel is actually synchronized and in phase with the clock h2 of the receiver B and at the middle of the eye of the eye diagram; therefore it is necessary to choose the "right group" containing the channel at the middle of the eye.

If only one group was selected at the end of the iterations of step d), then the chosen group is this single selected group.

If a plurality of groups were selected at the end of the iterations in step d), there are various ways of choosing this group: it is possible to choose the group having the highest value of m, i.e. to choose a group containing 9 successive channels of identical data rather than a group containing 7 successive channels of identical data; or to choose the group that contains the successive channels closest to the channel N/2, if N is even, or the closest to the channel (N+1)/2 if N is odd.

It is also possible to choose one of the selected groups by applying these two choice criteria. Specifically, it is possible to have a plurality of groups having the same highest number of identical channels and therefore to have to choose one of these groups by observing which contains the channels closest to the channel N/2 or to the channel (N+1)/2, depending on the parity of N.

This thus makes it possible to no longer have more than a single group selected for the selection of the channel in step e).

Moreover, preferably, the channel selected in step e) is the "middle channel" of a selected group, i.e. it is the channel m+1 of the group of (2m+1) successive channels. Thus, for a group of 3 channels, the selected channel will be the second channel of the group, or for a group of 5 channels, it will be the third channel of the group.

In step d), it is also possible to compare data only for channels belonging to a group selected in the preceding iteration. Thus, in the first iteration of step d), the comparison of the data is carried out for all the N channels, whereas in the following iterations, the comparison of the data is carried out only for the channels contained in the groups selected in the preceding iteration. This allows the comparison and selection of the groups to be accelerated over the course of the iterations.

In step d), preferably, it is first sought to select groups containing the most successive channels containing identical data. Thus, for example, groups containing 9 channels are selected rather than groups containing 7 channels. Therefore, at the end of an iteration, if two groups of 9 channels and 3 groups of 7 channels are selected, the search for the groups of channels containing identical data will be carried out only on the channels included in the two groups of 9 channels.

Preferably, during step d), the search for groups of (2m+1) successive channels containing identical data is carried out in parallel for each possible value of m. Thus, groups of 3 channels, groups of 5 channels, groups of 7 channels, etc. are sought in parallel.

According to one embodiment, step d) may also comprise defining a pointer containing the address of the row selected in this step, i.e. the address of the Pth channel, and storing it in a memory.

According to one embodiment, the condition of stoppage of the iterations of steps a) to d) may be a defined number of iterations, chosen by a user for example. A typical number of iterations is 1000.

According to another embodiment, the stoppage condition is met when there remains only a single group selected in step d), i.e. when there remains no more than a single group of (2m+1) successive channels containing identical data in each iteration of step d).

According to one embodiment of the invention, the value of m is chosen from {1; 2; 3; 4}, this making possible to compare the values of N channels per group of 3 successive channels, per group of 5 successive channels, per group of 7 successive channels and per group of 9 successive channels.

According to one embodiment, the time shift between each channel is the same for all the channels, and the channels are regularly time shifted.

According to one embodiment, step b) also comprises an interpolation of the data of the N channels, this allowing time delays that are shorter than those delivered by conventional delay circuits (for example, those delivered by inverters or buffers) to be generated. Thus, the delay between two successive channels is shorter. By virtue of this interpolation, it is possible to achieve a finer granularity and therefore to obtain more channels to be compared in one period of the clock h2.

According to one embodiment, the iterations of steps a) to d) are synchronized with each tick of the clock h1 of the transmitter A. The first iteration therefore corresponds to the first rising edge of the clock h1, the second iteration corresponds to the second rising edge of the clock h1 and the Ith iteration corresponds to the Ith rising edge of the clock h1, I being an integer higher than or equal to 1.

According to another embodiment, the iterations of steps a) to d) have a frequency equal to M×freq1 with M an integer higher than 2. Thus, the first iteration will for example take place on the first rising edge of the clock h1 and the Ith iteration will take place on the (I×M)th rising edge of the clock h1.

According to another embodiment, the iterations of steps a) and d) are not synchronized with the clock h1 of the transmitter A. The data D is sent regularly with a frequency lower than the frequency freq1 of the clock h1.

Fluctuations in temperature or possibly different emitter and receiver power supplies may create small variable time delays while the data are being sent to the receiver. This has the effect of time shifting, over time, the selected channel that is considered to be synchronized with the receiver. Thus, the selected channel will desynchronize slightly from the clock h2, and the channel actually synchronized with h2 will be one of the neighbouring channels. It is therefore important to continuously verify whether the selected channel is still synchronized with the clock h2 and, therefore, that it is not necessary to modify the value of P.

[FIG. 3] shows a schematic of the steps of a synchronizing method, according to one embodiment of the invention, comprising additional steps allowing potential time delays created by power-supply fluctuations and/or by temperature fluctuations to be taken into account and thus the value of P to be adapted. After the value of P has been defined in step e), step f) consists in sending a digital datum D' from the transmitter A to the receiver B and in generating N channels each containing the digital datum D', with N an integer higher than or equal to 3, each ith channel being time shifted with respect to the (i−1)th channel, and i being an integer comprised between 2 and N. After the generation of the N channels, the N channels are sampled at the frequency freq2 of the clock h2 of the receiver. As indicated in the description of FIG. 1, the N channels may be sampled in one go or in a plurality of sampling substeps (steps c', c" and c'")) such that the sampling in its entirety corresponds to sampling at the frequency freq2.

In step g), the digital data (generated from the datum D') of the (2m+1) successive channels of the group selected in step d) and containing the Pth channel, P being defined in step e) of the method, are compared.

In step h), the value of P is modified if the values of the digital data compared in step g) are different. Thus, if the datum of the channel m of the group of (2m+1) channels is different from the datum of the channel (m+1), then the value of P becomes (P−1), whereas if the datum of the channel (m+2) of the group of (2m+1) channels is different from the datum of the channel (m+1), then the value of P becomes (P+1). If the data are identical, the value of P is not modified.

The value of P, modified or not in step h), then allows which channel is synchronized with the clock signal h2 of the receiver to be defined, and therefore which channel is delivered to the receiver to be defined.

[FIG. 4] shows a device for synchronizing digital data according to the invention allowing the method described above to be implemented. The device comprises a circuit CMF for formatting the digital datum D sent by a sender A having a clock signal h1 of frequency freq1. The formatting circuit CMF is connected to an input IN of the device and is configured so as to receive a digital datum D from the sender A and to generate N channels that are time shifted with respect to one another, N being an integer higher than or equal to 3. In the device shown in FIG. 4, the formatting circuit CMF comprises an equalizer E that receives the datum D and outputs the datum D and its complement $\overline{D}$ on its differential output (therefore two different channels are output from the equalizer E). A plurality of inverters (I1 to I6 and I7 to I12) in series are connected to the two outputs of the equalizer E. It is the inverters (I1 to I12) that allow the time shift between the N channels (here N=6) that each contain the digital datum D received on the input IN of the device to be generated. Thus, the first channel V1 is generated at the output of the first inverter I1 from the output of the equalizer E comprising the complemented datum $\overline{D}$, and the second channel V2 is generated at the output of the second inverter I8 from the output of the equalizer E comprising the datum D.

The device also comprises flip-flops BS, in particular D-type flip-flops, i.e. so-called "data flip-flops", which allow the N channels to be sampled at the frequency freq2 of the receiver B. Each channel comprises at least one flip-flop BS.

The output of each flip-flop BS of the N channels is applied to a sequential digital circuit, called the state machine ME, which therefore receives as input the N channels sampled at the frequency freq2. The state machine ME is configured to receive the N sampled channels, to compare the digital data of the N channels in groups of (2m+1) successive channels, to select at least one group of (2m+1) successive channels containing identical data, to select one of the channels of the selected groups and to define the value of P. A person skilled in the art will be able to produce this sequential digital circuit and production thereof will pose no particular difficulty thereto.

The state machine ME may also be configured to be able to choose one group among the selected groups. In may also comprise a memory and be configured to define a pointer containing the address of the selected channel, which will be stored in the memory.

A multiplexer MUX may also be present at the output of the state machine ME in order to receive the N channels received as input by the state machine ME after the machine ME has compared them. In this case, the state machine ME is also configured to deliver the address of the selected channel (for example by virtue of the pointer) as input to the multiplexer MUX so that the digital datum of the selected channel can be delivered as output from the multiplexer MUX.

A processing circuit CT_B comprised in the receiver B may be connected to the output of the multiplexer MUX in order to process the data of the received channel.

[FIG. 5] shows another synchronizing device allowing the method according to the invention to be implemented. This device again comprises a formatting circuit CMF that allows the N channels that are time shifted with respect to one another to be generated. In this other device, the complemented output $\overline{D}$ of the equaliser E is not used. The non-complemented output of the equaliser E comprises a plurality of buffers in series that allow the N channels and their delays to be generated. In this example, 6 buffers T and 6 channels (V1 to V6) have been shown. Thus, the first channel V1 is delivered as output from the first buffer T, the second channel V2 is delivered as output from the second buffer, etc.

Next, the 6 channels, and more generally the N channels, are sampled at freq2 on passage through flip-flops (BS1 and BS2). In this figure, two stages of flip-flops BS1 and BS2 in parallel have been shown, and therefore each channel here comprises two flip-flops. The first stage samples the N channels at the frequency freq2/2 and the second stage at the frequency freq2/2+1/(2×freq2).

Nevertheless, this device could comprise a single stage of flip-flops BS, as shown in FIG. 4, which each would sample one of the N channels at the frequency freq2, or it could comprise more than two stages of flip-flops BS in parallel, each stage of flip-flops BS sampling the N channels at a frequency strictly lower than freq2 and all of the stages of flip-flops BS together allowing N channels sampled at the frequency freq2 to be obtained, and the two clocks of two flip-flops of two successive channels being shifted by a half-period of the clock signal h2, i.e. shifted by 1/(2×freq2).

More generally, the device will comprise as many stages of flip-flops BS in parallel as there are sampling substeps in the method. Therefore, in a method comprising 3 sampling substeps (steps c'), c") and c'")), there will be 3 stages of flip-flops BS in parallel in the device. Preferably, the device comprises an even number of stages of flip-flops BS in parallel per channel.

If a plurality of stages of flip-flops BS are worked with, each flip-flop stage is time shifted by a half-period of the clock signal h2 of the receiver B with respect to the preceding stage. Thus, for each flip-flop stage different from the first stage, there is a shift of $1/(2 \times freq2)$ with respect to the preceding stage.

This makes it possible to work with higher-frequency signals, i.e. with receivers having a high clock frequency, despite the physical limits (especially those met during the fabrication) of the flip-flops, which are thus not capable of sampling correctly at high frequency. Currently, this frequency limit is about 6 GHz.

The device also comprises a sequential digital circuit, called the state machine ME, that receives as input the outputs of all the flip-flops BS. Thus, here, as there are two stages of flip-flops BS for each generated channel N, the state machine receives two signals, one output from the first flip-flop of the channel BS1 and another output from the second flip-flop of the channel BS2. More generally, the state machine ME receives as many signals for a channel as there are stages of flip-flops BS in this channel.

The state machine ME plays the same role as described above, namely that of comparing the data of the N channels in groups of (2m+1) successive channels, selecting the groups the channels of which contain identical data, then selecting a single channel and defining the value of P and optionally a pointer allowing the selected channel to be identified.

When the state machine ME receives a plurality of signals, because of the presence of a plurality of flip-flops BS in the channel, for a single channel, it compares the data of the N channels by comparing signals having undergone the same sampling. Therefore, it will compare all the signals of the N channels coming from the 1st stage of flip-flops BS1 and, in parallel, it compares all the signals of the N channels coming from the 2nd stage of flip-flops BS2.

The device also comprises as many multiplexers MUX1, MUX2 as there are stages of flip-flops BS in the device. Thus, in FIG. 5, as there are two stages of flip-flops BS1 and BS2, the device comprises two multiplexers MUX1 and MUX2. One of the multiplexers MUX1 receives as input the signals of the N channels output from the first stage of flip-flops BS1 and having been compared by the state machine ME, whereas the other multiplexer MUX2 receives as input the signals of the N channels output from the second stage of flip-flops BS2 and having been compared by the state machine ME. These multiplexers also each receive the pointer defined by the state machine, this allowing them to return as output the channel selected by the state machine ME. It is a processing circuit CT_B that receives the outputs (d1, d2) of the multiplexers representing the selected channel and thus reconstructs the data of this selected channel with sampling at freq2.

According to another embodiment of the invention, the multiplexers are comprised in the state machine ME, and therefore the output of the state machine is directly the selected channel sampled at freq2 or one of the sub-channels (d1, d2) of the selected channel at a plurality of sampling frequencies because of the various flip-flop stages.

According to another embodiment, the device comprises latches instead of flip-flops BS to carry out the sampling of the data of the N channels. Two latches are required to replace a single flip-flop BS. Thus, each channel comprises at least two latches.

According to some embodiments, the state machine may be a computer, a microcontroller, a field-programmable gate array (FPGA) or an application-specific integrated circuit (ASIC).

The invention claimed is:

1. A method for synchronizing digital data (D) sent in series by a transmitter (A) having a clock signal (h1) of frequency (freq1) to a receiver (B) having a clock signal (h2) of frequency (freq2), characterized in that it comprises the steps a) to d) iterated until a stoppage condition is met and a step e) carried out following the last iteration of step d), the steps a) to e) being the following:
   a) sending by the transmitter (A) a digital datum to the receiver (B);
   b) generating N channels, each of the channels containing the datum received by the receiver, and each ith channel being time shifted with respect to the (i−1)th channel, N being an integer greater than or equal to 3 and i being an integer between 2 and N;
   c) sampling the N channels at the frequency (freq2) of the clock (h2) of the receiver in order to generate digital data temporally aligned with the clock (h2);
   d) comparing the data of the N channels in groups of (2m+1) successive channels, m being greater than or equal to 1 and such that (2m+1) is less than or equal to N, and selecting groups of (2m+1) channels in which the (2m+1) successive channels contain identical data in each iteration;
   e) selecting one of the channels belonging to the group selected in the preceding step, the data contained in this channel being considered to be synchronized and in phase with the clock (h2) of the receiver and defining a variable (P) equal to the value (i) of the selected channel.

2. The method for synchronizing digital data according to claim 1 wherein, during the first iteration of step d), the comparison of the values in groups of (2m+1) successive channels is carried out on the N channels and during the following iterations, it is carried out on all the (2m+1) successive channels comprised in the groups selected in the preceding iteration of step d).

3. The method for synchronizing digital data according to claim 1, comprising a step d') carried out between the last iteration of step d) and step e) in which a group of (2m+1) successive channels is chosen among the groups selected in the last iteration of step d), this chosen group possibly being the group selected in the last iteration of step d), or among the groups selected in the last iteration of step d), this chosen group possibly being the group having the highest value of m, or among the groups selected in the last iteration of step d), this chosen group possibly being the group the successive channels of which are closest the channel N/2 if N is an even number or the channel (N+1)/2 if N is an odd number.

4. The method for synchronizing digital data according to claim 1 wherein the channel selected in step e) is the channel m+1, of a group of (2m+1) successive channels, selected in the preceding step.

5. The method for synchronizing digital data according to claim 1, wherein the stoppage condition is chosen among a number of iterations defined by a user or being that there remains only a single group of (2m+1) successive channels having identical data in step d).

6. The method for synchronizing digital data according to claim 1 wherein step b) also comprises an interpolation of the data of the N channels.

7. The method for synchronizing digital data according to claim 1, wherein m is an integer between 1 and 4.

8. The method for synchronizing digital data recording to claim 1, wherein step c) comprises a plurality of substeps (steps c'), c''), c''')) of sampling the N channels at frequencies strictly lower than the frequency (freq2), so that following all the sampling substeps, the N channels will have been sampled at the frequency (freq2).

9. The method for synchronizing digital data according to claim 1, comprising the following additional steps carried out following step e):
   f) sending by the transmitter (A) a digital datum to the receiver (B), generating N channels, each of the channels comprising the datum received by the receiver, and each ith channel being time shifted with respect to the (i−1)th channel, N being an integer greater than or equal to 3 and i being an integer between 2 and N, and sampling the N channels at the frequency (freq2) in order to generate digital data temporally aligned with the clock (h2);
   g) comparing the digital data of the (2m+1) successive channels of the group selected in step d) and containing the Pth channel, the variable (P) being defined in step e);
   h) modifying the value of the variable (P) if the values of the data of the (2m+1) channels compared in step g) are different, such that if the datum of the channel m of the group of (2m+1) channels is different from the channel (m+1), then the value of variable (P) becomes equal to (P−1), or such that is the datum of the channel m+2 of the group of (2m+1) channels is different from the channel (m+1), then the value of the variable (P) becomes equal to (P+1).

10. A device for synchronizing digital data for implementing a synchronizing method according to claim 1, comprising:
   a formatting circuit (CMF) for formatting a digital datum (D) received on an input (IN) of the device, comprising N outputs and connected to the input of the device and configured so as to generate N channels (V1 to V6) each containing the digital datum (D) and to time shift each channel with respect to the preceding channels, N being an integer greater than or equal to 3 and the N channels corresponding to the N outputs of the circuit;
   flip-flops (BS) configured so that the N channels are sampled at a frequency lower than or equal to the clock frequency (freq2) of the receiver (B), the N channels comprising at least one flip-flop; and
   a state machine (ME) configured to receive as input at least N sampled channels and to compare the data of (2m+1) channels contained in the same group, to select at least one group of (2m+1) successive channels, to select a channel belonging to a selected group and to define the value of the variable (P).

* * * * *